Dec. 18, 1956  H. W. BATCHELLER  2,774,952
CONNECTOR MEMBER WITH CURVED FLANGE EXTENSIONS
Filed Oct. 6, 1954
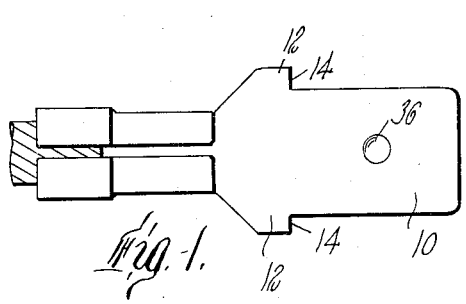
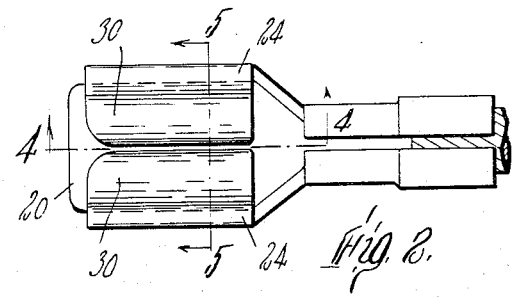
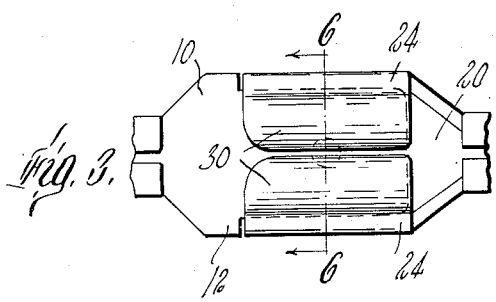
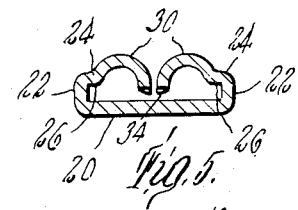
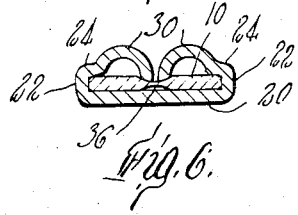
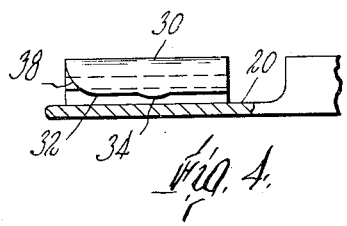
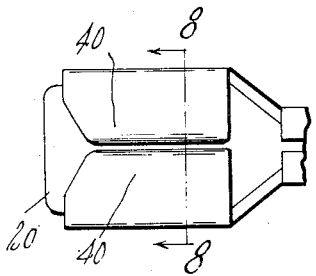
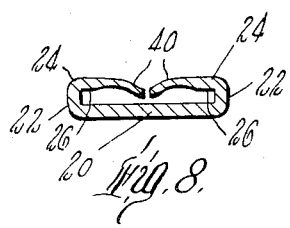
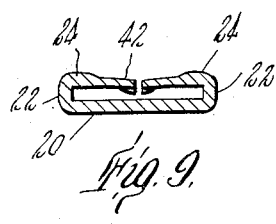

United States Patent Office 2,774,952
Patented Dec. 18, 1956

2,774,952

CONNECTOR MEMBER WITH CURVED FLANGE EXTENSIONS

Hugh W. Batcheller, Newton Highlands, Mass., assignor to Kent Mfg. Corp., Newton, Mass., a corporation of Massachusetts Application October 6, 1954, Serial No. 460,631

4 Claims. (Cl. 339—258)

This invention relates to an improved construction of a female member of an electrical connector, the corresponding male member of the connector being primarily a plane rectangular tongue.

It is an object of the invention to provide a female member which is simple and easy to make and which also is proof against accidental injury from careless handling in making connections with a corresponding male connector member.

In order to have a good electric connection, it is necessary that the connector members be so constructed that when they are assembled they will have surface areas firmly pressed together in mutual contact. For this purpose female connector members have been variously constructed to cooperate with a male member consisting principally of a plane tongue. One such female member is in the form of a shallow channel having a floor with upstanding side walls spaced to receive the tongue of the male connector member between them. The side walls have extensions which are curled inward and downward so that their extremities bear on the upper face of the male member and press such member resiliently against the floor of the female member. It frequently happens, however, that the connector is carelessly handled when a connection is being made or broken, the male member being handled in such a way that the plane of its tongue is at an angle to the plane of the floor of the female member. This is apt to force the curved extensions of the side walls of the female member to positions beyond their elastic limit whereupon the extensions can no longer press a male member against the floor of the female member. According to the present invention, rigid stops are provided to prevent the occurrence of such injury to the member.

The invention is hereinafter fully described and is illustrated on the drawing, of which—

Figure 1 is a plan view of a conventional male connector member;

Figure 2 is a plan view of a corresponding female connector member embodying the invention;

Figure 3 is a plan view of the two said members in assembled relation;

Figure 4 is a section on the line 4—4 of Figure 2;

Figure 5 is a section on the line 5—5 of Figure 2;

Figure 6 is a section on the line 6—6 of Figure 3;

Figure 7 is a plan view of a connector member embodying a modified form of the invention;

Figure 8 is a section on the line 8—8 of Figure 7; and

Figure 9 is a sectional view of another modified form.

A male connector member of a kind which is widely used is illustrated in Figure 1. This comprises a plane rectangular tongue 10 with a wider base 12 forming shoulders 14 which limit the distance which the tongue extends in the channel of the corresponding connector member. In Figures 2, 4 and 5 is illustrated a female connector member embodying the invention. This member which can conveniently be made from a blank cut out of sheet brass, comprises a shallow channel having a floor 20 which is preferably plane and is just wide enough to receive the tongue 10 of the other member. Parallel side walls 22 rise from the side edges of the floor 20. Each of these side walls has a narrow inturned flange 24 overhanging a marginal portion of the floor 20 and spaced above the floor a distance just enough to receive the side margins of the tongue 10 with such slight clearance as may be required to allow for small variations in the stock thickness of the material of which the male members are made. The flanges 24 thus form shoulders 26 which are parallel to the floor 20 and are engaged or nearly engaged by the margins of a tongue 10 when the members are assembled as illustrated in Figures 3 and 6.

Each of the flanges 24 has an extension 30 which terminates over the floor 20 near the middle thereof at a height slightly less than the thickness of the tongue 10. The purpose of these extensions is to yield resiliently upward when a tongue 10 is inserted in the channel and thus to press the tongue against the floor 20 so as to make a good electrical connection. To provide sufficient resilience for the purpose, the length of each extension may be increased by bending or curling it into an arched form as indicated in Figure 5. The free end of each extension 30 is a straight edge 32 which is parallel to the floor 20 and presses on the top face of the tongue 10 when the members are assembled. On each edge 32 is preferably a slight arcuate projection 34 adapted to enter a central recess 36 in the tongue 10 when the members are assembled. This serves to resist a separation of the members. The leading end of the tongue 10 is preferably rounded to facilitate its introduction into the channel under the edges 32. Corners of the extensions 30 are rounded or chamfered as at 38 for the same purpose. When the tongue is thrust into the channel so as to be pressed between the floor 20 and the edges 32 of the extensions 30, the extensions are forced upward enough to admit the tongue into the channel. Excessive distortion of the extensions by the tongue is prevented, however by the engagement of the side margins of the tongue under the shoulders 26 of the flanges 24. Since these flanges are narrow and therefore offer but little leverage, they serve as rigid stops to keep the entering tongue in the plane of the channel and thus to prevent the tongue from springing the extensions 30 upward beyond their elastic limit.

A slightly modified form of the invention is illustrated in Figures 7 and 8. The female connector member has a floor 20, side walls 22, flanges 24 and shoulders 26, as previously described, but in this example extensions 40 from the flanges are swaged or cold-worked to a lesser thickness than the original stock thickness, additional hardness and resilience resulting from the swaging operation where the usual medium soft brass or bronze is used as the material. Owing to the increase in hardness and resilience, the extensions 40 need not be arched as much as the extensions 30 previously described.

The form of the invention shown in Figure 9 is similar to that shown in Figure 8 except that the extensions 42 thereon have been swaged by striking the surfaces which are uppermost in the finished member, instead of striking the under faces as in the case of the extensions 40.

I claim:

1. A female electrical connector member consisting of a single piece of sheet metal bent into the form of a shallow channel with a plane floor, parallel side walls at the sides of the floor, a narrow flange projecting inward from each wall parallel to the floor, and a resilient extension on each said flange having its free end disposed above the middle portion of said floor and nearer thereto than are said flanges, 2. A connector member as in claim 1, each said extension being arched upward.

3. A connector member as in claim 1, each said extension being thinner and harder than said floor.

4. In combination with an electrical connector member comprising principally a rectangular plane tongue of uniform thickness, a female connector member consisting of a single piece of sheet metal bent into the form of a shallow channel with a plane floor slightly wider than said tongue, side walls rising vertically from the side edges of the floor, a narrow flange projecting inward from each said wall parallel to the floor and spaced from the floor a distance slightly greater than the thickness of said tongue, and a resilient extension on each said flange having its free edge disposed above the middle portion of the floor and spaced therefrom a distance slightly less than the thickness of said tongue.

References Cited in the file of this patent

UNITED STATES PATENTS

| | | |
|---|---|---|
| 2,579,739 | Hayes | Dec. 25, 1951 |
| 2,600,190 | Batcheller | June 10, 1952 |